Figure 4:
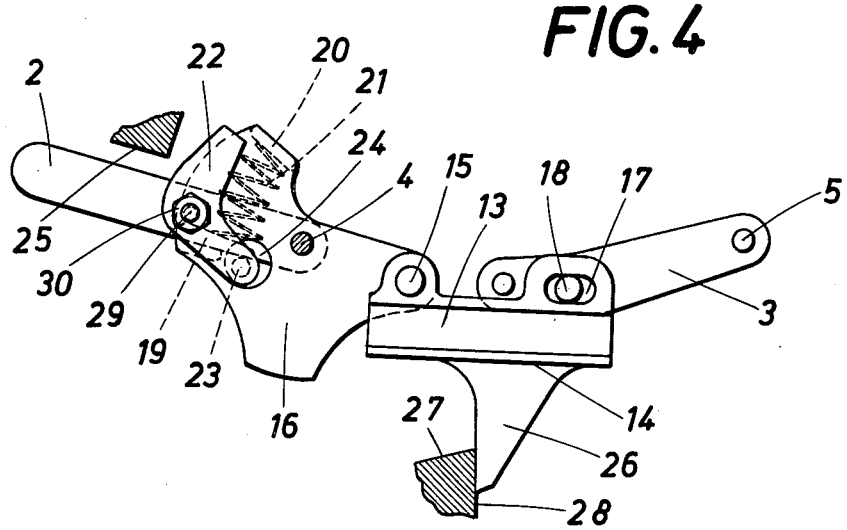

United States Patent [19]

Tuksa

[11] 4,158,969

[45] Jun. 26, 1979

[54] SHIFTING MECHANISM FOR MOTOR VEHICLE TRANSMISSION

[75] Inventor: Emerich Tuksa, Graz, Austria

[73] Assignee: Steyr-Daimler-Puch Aktiengesellschaft, Vienna, Austria

[21] Appl. No.: 840,325

[22] Filed: Oct. 7, 1977

[51] Int. Cl.² .......................... G05G 5/10; G05G 9/12; B60K 17/34
[52] U.S. Cl. .................................... 74/477; 180/44 R
[58] Field of Search ............................ 74/473 R, 477; 180/44 R

[56] References Cited

U.S. PATENT DOCUMENTS

| 3,354,741 | 11/1967 | Johnston, Jr. et al. | 74/477 |
| 3,529,487 | 9/1970 | Dolan | 180/44 R X |
| 3,765,261 | 10/1973 | Hobbins | 74/477 |

FOREIGN PATENT DOCUMENTS

| 462512 | 7/1928 | Fed. Rep. of Germany. |
| 1405858 | 6/1960 | Fed. Rep. of Germany. |
| 1530713 | 9/1963 | Fed. Rep. of Germany. |

*Primary Examiner*—Allen D. Herrmann
*Attorney, Agent, or Firm*—Kurt Kelman

[57] ABSTRACT

A shifting mechanism for a motor vehicle transmission comprises first and second stationary pivots transversely spaced apart. A range shifting fork is pivotally movable about said first pivot to a plurality of range control positions, which include a slow range position, a fast range position, and a no-load position. An axle shifting fork is pivotally movable about said second pivot to a plurality of clutch control positions, which include a clutch-engaging position and a clutch-disengaging position. A bridge extends transversely to the shifting paths and has one end portion connected to the range shifting fork and a second end portion connected to the axle shifting fork. A first pivotal joint is spaced from said first pivot and pivotally connects said first end portion of said bridge to said range shifting fork. A second pivotal joint is spaced from said second pivot and pivotally connects said second end portion of said bridge to said clutch control fork. A manually operable selector lever is movable along said bridge to positions near said first and second pivotal joints, respectively, and transversely to the longitudinal direction of said bridge. Coupling means connect said lever to said bridge and are adapted to impart to said bridge a pivotal movement about each of said pivotal joints in response to a movement of said lever in the direction which is transverse to the longitudinal direction of said bridge when said lever is in a position near the other of said pivotal joints.

10 Claims, 5 Drawing Figures

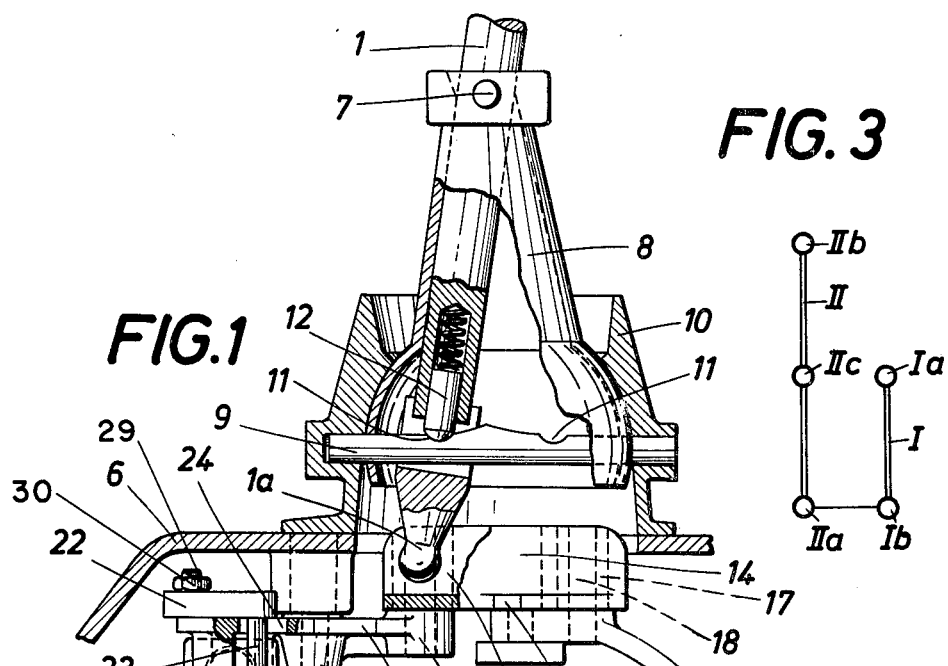
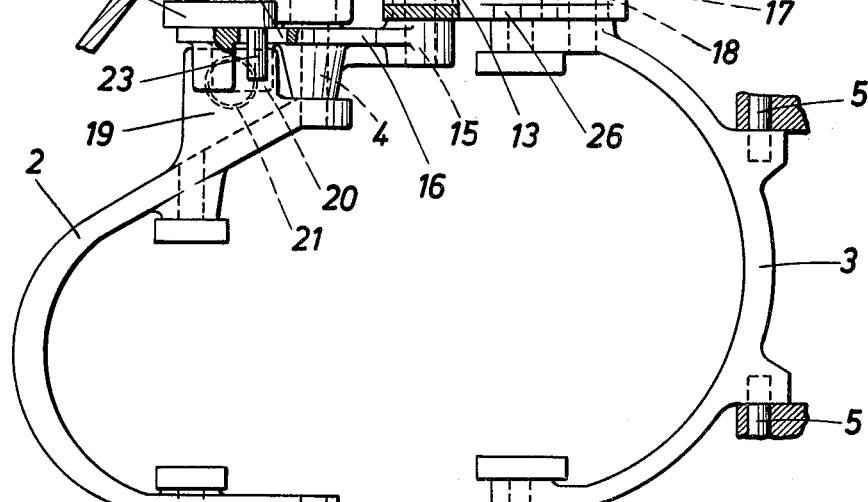
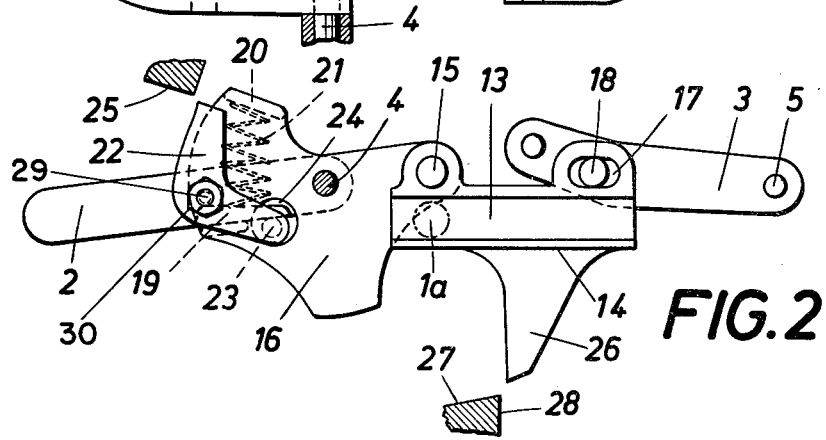

SHIFTING MECHANISM FOR MOTOR VEHICLE TRANSMISSION

This invention relates to a shifting mechanism for shifting a power-dividing transmission for motor vehicles, which transmission is operable to selectively transmit power to the front axle drive in addition to the rear axle drive and constitutes also a range selector comprising a road travel gear and a front axle drive, said transmission comprising two shifting forks and a common manual selector lever, which is movable along two shifting paths associated with respective ones of said shifting forks.

In known mechanisms of that kind, the two shifting forks are mounted on parallel shifting rods and the shifting finger of the manual selector lever selectively engages mating recesses, which face each other and are formed in the two parallel shifting rods. To engage the road travel gear and front axle drive of the range selector and to selectively connect and disconnect the front axle drive, one or the other shifting rod is shifted in the longitudinal direction of the vehicle by means of the manual selector lever, which engages the recess of the respective shifting rod. On the other hand, when the front axle drive has been connected, so that the all-wheel drive is in operation, and the shifting finger of the manual gearshift lever is disengaged from the associated shifting rod, e.g., because the range selector is to be shifted, that shifting rod may be displaced because the shifting sleeve is loaded by the torque which is exerted. If a conventional gate is provided, the driver is unable in such case to couple the shifting finger of the manual selector lever with the shifting rod so as to connect the front axle drive and the latter cannot be connected. The vehicle may even become entirely inoperative if the shifting finger of the manual selector lever is in engagement with the shifting rod for connecting the front axle drive and the road travel gear which is initially engaged is unintentionally disengaged so that a no-load position between the road travel gear and front axle drive travel gears is assumed. Even when there is no gate, it is very difficult to move the shifting finger into the recess of the respective other shifting rod in case of a change of the shifting path, i.e., when the manual selector lever is pivotally moved from one shifting rod to the other, and this will excessively divert the driver's attention. All these difficulties are due to the difference between the power-dividing transmission and a conventional change-speed transmission that one shifting rod must be disengaged when the other is to be shifted and the transmisson elements coupled to said disengaged shifting rod are partly under load when the vehicle is travelling so that an undesired shifting of that shifting rod or a disengagement of the corresponding shifting sleeve can easily occur.

It is already known to provide conventional mechanical means, such as locking pins or locking balls (German Pat. No, 1,530,713) or locking levers (German Pat. No. 462,512) for axially holding each shifting rod in position during a shifting of the other shifting rod. Such mechanical locking of the shifting rod is unobjectionable in the conventional transmissions only when they are under no load but in the transmission according to the invention would result in a constant loading of the respective shifting fork when the gear is shifted under load and the respective shifting sleeve tends to become disengaged. The resulting wear will not be noticed by the driver until the transmission has eventually suffered severe damage.

It is also known to provide a power-dividing transmission in which the shifting sleeve associated with the two gears of the range selector is connected by a two-armed lever to the shifting sleeve for connecting the front axle drive (German Pat. No. 1,405,858). This arrangement has the disadvantage that the front axle drive must always be engaged when the front axle drive is to be connected so that the road travel gear cannot be utilized when both axles are driven.

It is an object of the invention to eliminate these disadvantages and so to improve a shifting mechanism of the kind described first hereinbefore that after a disengagement of the clutch members for the front axle drive or of the and road trvel gear the manual selector lever can readily be returned to that position which enables a renewed engagement of the desired axle drive. It is also desired to provide a relatively simple structure in which the free selection of the modes of operation of the transmission is not unfavorably restricted.

This object is accomplished according to the invention in that the two shifting forks are pivoted in known manner on parallel axes in the transmission housing and are coupled by a bridge, which in a manner known per se extends parallel to the shifting paths and is provided with a longitudinal guide for engagement by the shifting finger of the manual selector lever and is connected to each shifting fork by a pivot pin, e.g., by a pin-slot coupling.

During a shifting of the range selector or when the front axle drive is being connected or disconnected, the shifting finger which performs the shifting operation engages the bridge at one end or the other of the longitudinal guide so that the bridge is carried along and is thus pivotally moved about the other end of the bridge or guide and the shifting fork disposed at that end which is moved by the shifting finger follows the movement to the desired position. When the shifting finger is then moved to the other end of the bridge or guide to perform a shifting operation there and this causes the initially shifted sleeve or the like to become disengaged, that end of the bridge which is connected to the respective shifting fork will follow the movement which is due to the disengagement and the shifting finger can easily be moved back in the longitudinal guide to the respective shifting path or the corresponding end of the bridge and be operated to re-engage the disengaged gear or the axle drive clutch. The connection of the two shifting forks by the bridge and the longitudinal guide provided in the bridge for guiding the shifting finger thus enable the latter to move to each shifting path or gearshift fork or bridge end to perform or repeat a shifting operation regardless of the position of the shifting fork or bridge at the other end.

Whereas a functionally similar transmission has been disclosed in U.S. Pat. No. 3,354,741, that patent does not disclose pivoted shifting forks which are connected by a bridge but discloses displaceable shifting rods, which involve a complicated structure and a larger space requirement.

According to a further feature of the invention the bridge is provided with a locking nose and the transmission housing has a stop face which is engaged by the locking nose when the bridge is in the position in which the front axle drive is connected and is engaged. As a result, when the front axle drive is engaged so that a higher torque is available, the vehicle cannot be driven only via the rear axle, which would have to be stronger in that case. When the front axle drive is connected and is engaged and the rear axle drive is to be used alone, the road travel gear must be engaged first so that the locking nose is disengaged from the stop face and the transmission can then be shifted as desired.

The transmission housing may have a second stop face, which is engaged by the locking nose before the front axle drive gear is engaged when the front axle drive is disconnected. In that case the driver cannot shift the transmission from the road travel gear to the no-load position of the range-selecting transmission and vice versa unless the front axle drive is disconnected, and he cannot engage the front axle drive when only the rear axle drive is connected so that an excessively high torque would be exerted on the rear axle.

In accordance with the invention the bridge is connected by the pivot pin to a pivoted lever and a shifting spring is interposed between that pivoted lever and the shifting fork for connecting the front axle drive. When it is desired to connect the front axle drive and the opposing shifting dogs are not in position to interengage, it is no longer necessary before the actual shifting movement to apply pressure to the manual selector lever in the usual manner until the shifting dogs can be interengaged during a certain phase of travel when the front and rear axles have been caused to rotate at different speed, e.g., as a result of steering movements. In the present arrangement, the movement of the manual selector lever in the clutch-engaging sense results first in a prestressing of the shifting spring and when the dogs are in the proper position the spring causes the shifting fork to automatically engage the clutch for the front axle drive. In a particularly suitable arrangement, the pivoted lever carries a spring-loaded locking pawl, which is pivotally movable in a limited range and which, when the shifting spring is stressed, moves behind a stop that is rigid with the housing so that the pivoted lever is thus held in the spring-stressing position and the driver can release the manual selector lever when he has stressed the spring. The locking pawl will then hold the pivoted lever in position when the spring is stressed and the locking pawl will not disengage its stop until the spring has relaxed and the front wheel drive clutch has been engaged. Thereafter the locking pawl no longer influences the pivoted lever and the transmission can be shifted to all modes of operation.

Figure 5:
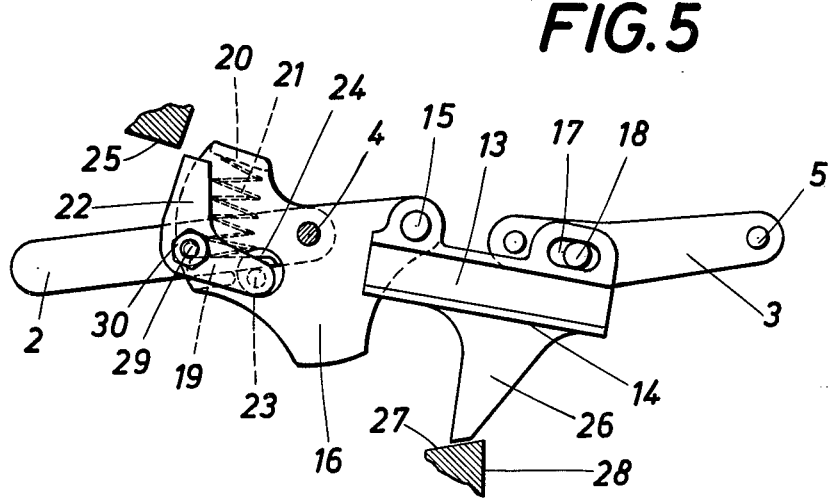

The invention is illustrated by way of example on the accompanying drawing, in which FIG. 1 is a vertical sectional view showing the essential parts of a shifting mechanism for shifting a power-dividing transmission, FIG. 2 is a top plan view showing the transmission when the cover and manual selector lever has been removed, FIG. 3 is a diagram illustrating the shifting paths, and FIGS. 4 and 5 are similar to FIG. 2 but show two other positions.

FIG. 3 shows that there are two shifting paths I, II. Path I includes the positions assumed by the handle knob of the manual selector lever 1 when only the rear axle drive is connected (position Ia) and when the front axle drive is also connected (position Ib). Path II includes a position IIa for the road travel range, i.e., the fast range, a position IIb for the cross-country travel range, i.e., the slow range and an intermediate no-load position IIc. In accordance with that diagram, the left-hand axle shifting fork 2 in FIGS. 1 and 2 is associated with shifting path I and the right hand range shifting fork 3 serves to control the range selector when the selector lever is positioned on path II. The shifting sleeves and transmission shafts are not shown, for the sake of clearness. In the embodiment shown by way of example the two shifting forks 2, 3 are pivoted to the transmission housing 6 on pins 4, 5.

The manual selector lever 1 is pivoted in a bell-shaped member 8 on a pivot 7, which is parallel to the shifting paths I, II. The bell-shaped member 8 is pivoted in the cover 10 of the transmission housing 6 on a transverse pivot 9. The transverse pivot 9 extends through a suitable aperture in the manual selector lever 1 and is formed with notches 11, which are engageable by a spring-loaded detent pin 12, which is mounted in the stem of the manual selector lever 1 so that the angular positions of the manual selector lever 1 associated with the two shifting paths I, II are defined.

The shifting finger 1a of the manual selector lever 1 extends into a longitudinal groove 13 of a bridge 14, which extends transversely to the shifting paths I, II. The bridge 14 is connected at one end by a pivot pin 15 to a pivoted lever 16 and has at the other end a slot 17, which receives a pin 18 that protrudes from the range shifting fork 3. The pivoted lever 16 is hinged on the same pin 4 as the axle shifting fork 2. The axle shifting fork 2 is provided with an upright extension 19, and the pivoted lever 16 has a depending extension 20. A shifting spring 21 consisting of a compression spring is held between the extensions 19 and 20. A locking pawl 22 is hinged by a bolt 29 secured by nut 30 on pivoted lever 16 and the locking pawl is biased by a spring, not shown, and carries a pin 23, which extends into a bore 24 of the pivoted lever.

When it is desired to connect the front axle drive and for this purpose the manual selector lever 1 is moved to the rear along shifting path I (from position Ia to position Ib in FIG. 3), the bridge 14 is pivotally moved in the clockwise sense, the pivoted lever 16 connected to the bridge is pivotally moved in the counterclockwise sense, and the lever 16 acts by means of the shifting spring 21 on the axle shifting fork 2 and tends to carry the latter along in the counterclockwise sense. If it is not yet possible to engage the front axle drive, the shifting spring 21 will be stressed. At the same time the locking pawl 22 is pivotally moved in the counterclockwise sense and is locked behind a stop 25, which is rigid with the housing, so that the pivoted lever 16 is held in the spring-stressing position even when the driver has released the manual selector lever 1. When the front axle drive has been engaged under the continued pressure of the axle shifting spring 21, the shifting fork 2 is pivotally moved to the position shown in FIG. 2 and by means of the pin 23 carries the locking pawl 22 along and pulls it away from the stop 25 so that the transmission is again ready for the selection of any mode of operation.

When the manual selector lever 1 is pivotally moved into the shifting path II, the shifting finger 1a moves to the right in FIG. 2 in the longitudinal groove 13 of the bridge 14. Thereafter, a movement of the manual selector lever along shifting path II will result in a pivotal movement of the range shifting fork 3 in one direction or the other so that one gear or the other of the range selector is engaged while the bridge 14 is pivotally moved about the pin 15. The bridge 14 has a locking nose 26, with which two stop faces 27, 28 of the transmission housing 6 are associated. In the position shown in FIG. 2, in which the front axle drive is connected, the bridge 14 can be freely pivotally moved to cause one or the other gear of the range selector to be engaged. When the bridge 14 is pivotally moved about the pin 15 in the clockwise sense to cause the front axle drive to be engaged, the locking nose 26 will engage the stop face 27 (see FIG. 5) so that the bridge 14 cannot impart a pivotal movement to the axle shifting fork 2 so as to disconnect the front axle drive. The road travel gear cannot be engaged unless the front axle drive is disconnected. When the front axle drive is disconnected and it is then desired to engage the front axle drive by a pivotal movement of the bridge 14 in the clockwise sense, that shifting movement will be prevented by the engagement of the locking nose 26 with the stop face 28 (FIG. 4).

What is claimed is:

1. A shifting mechanism for a motor vehicle transmission, comprising
   first and second stationary pivots, which are transversely spaced apart,
   a range shifting fork which is pivotally movable about said first pivot to a plurality of range control positions, which include a slow range position, a fast range position, and a no-load position,
   an axle shifting fork which is pivotally movable about said second pivot to a plurality of clutch control positions, which include a clutch-engaging position and a clutch-disengaging position,
   a bridge extending transversely to the shifting paths and having first and second end portions, the first bridge end portion being connected to the range shifting fork and the second bridge end portion being connected to the axle shifting fork,
   a first pivotal joint which is spaced from said first pivot and pivotally connects said first end portion of said bridge to said range shifting fork,
   a second pivotal joint which is spaced from said second pivot and pivotally connects said second end portion of said bridge to said axle shifting fork,
   a manually operable selector lever which is movable along said bridge to positions near said first and second pivotal joints, respectively, and which is movable transversely to the longitudinal direction of said bridge, and
   coupling means connecting said lever to said bridge and adapted to impart to said bridge a pivotal movement about each of said pivotal joints in response to a movement of said lever in the direction which is transverse to the longitudinal direction of said bridge when said lever is in a position near the other of said pivotal joints.

2. A shifting mechanism as set forth in claim 1, in which said coupling means comprise a shifting finger carried by said lever and a longitudinal guide which is provided on said bridge and in engagement with said shifting finger and adapted to guide said shifting finger along said bridge.

3. A shifting mechanism as set forth in claim 1, in which one of said pivotal joints comprises a pivot pin and a slot which receives said pivot pin.

4. A shifting mechanism as set forth in claim 1, which comprises locking means arranged to retain said axle shifting fork in said front axle drive-engaging position when said range shifting fork is in said slow range position.

5. A shifting mechanism as set forth in claim 4, in which said locking means comprise a stationary stop face and a locking nose which is rigid with said bridge and arranged to engage said stop face when said range shifting fork is in said slow range position and said axle shifting fork is in said front axle drive-engaging position.

6. A shifting mechanism as set forth in claim 4, in which said locking means are arranged to prevent a movement of said range shifting fork to said slow range position when said axle shifting fork is in said front axle drive-disengaging position.

7. A shifting mechanism as set forth in claim 6, in which said locking means comprise first and second stationary stop faces and a locking nose which is rigid with said bridge and arranged to engage said first stop face when said range shifting fork is in said slow range position and said axle shifting fork is in said front axle drive-engaging position and arranged to engage said second stop face so as to prevent a movement of said range shifting fork to said slow range position when said axle shifting fork is in said front axle drive-disengaging position.

8. A shifting mechanism as set forth in claim 1, in which said axle shifting fork comprises
   a fork member which is movable to said front axle drive positions,
   a pivoted lever which is pivoted at one end to said bridge at said second pivotal joint and has a middle portion hinged to said second pivot, and
   spring means which resiliently oppose an angular movement of said fork member relative to said pivoted lever in the direction from said front axle drive-engaging position to said front axle drive-disengaging position and to assist an angular movement of said fork member relative to said pivoted lever in the direction from said front axle drive-disengaging position to said front axle drive-engaging position.

9. A shifting mechanism as set forth in claim 8, which comprises locking means arranged to hold said pivoted lever in said spring means pressing position when said fork member is in said front axle drive-disengaging position and during the movement of said fork member from said front axle drive-disengaging position to said front axle drive-engaging position under the action of said spring means.

10. A shifting mechanism as set forth in claim 8, in which said locking means comprise
    a stationary stop face and
    a spring-loaded locking pawl carried by said shifting lever and angularly movable relative thereto within a limited range and adapted to hold said shifting lever in said actuated position by engagement with said stop face when said fork member is in said clutch-disengaging position and to disengage said stop face when said fork member is in said clutch-engaging position.

* * * * *